United States Patent [19]
Ikedo

[11] Patent Number: 5,900,881
[45] Date of Patent: May 4, 1999

[54] COMPUTER GRAPHICS CIRCUIT

[76] Inventor: Tsuneo Ikedo, 238-39, Aza-gonohara, Oaza-kamega, Ikki-machi, Aizuwakamatsu-shi, Fukushima-ken, Japan

[21] Appl. No.: 08/754,237

[22] Filed: Nov. 20, 1996

Related U.S. Application Data

[63] Continuation-in-part of application No. PCT/JP96/00726, Mar. 21, 1996.

[30] Foreign Application Priority Data

| Mar. 22, 1995 | [JP] | Japan | 7-102904 |
| Mar. 22, 1995 | [JP] | Japan | 7-102905 |
| Mar. 22, 1995 | [JP] | Japan | 7-102906 |

[51] Int. Cl.⁶ ............................................. G06F 15/00
[52] U.S. Cl. ............................................. 345/426
[58] Field of Search .................... 345/426, 430, 345/431, 432, 117, 118, 131

[56] References Cited

U.S. PATENT DOCUMENTS

| 4,808,988 | 2/1989 | Burke et al. | 340/744 |
| 4,899,295 | 2/1990 | Nonweiler | 364/522 |
| 4,974,177 | 11/1990 | Nishiguchi | 364/522 |
| 5,214,753 | 5/1993 | Lee et al. | 395/125 |
| 5,255,352 | 10/1993 | Falk | 395/125 |

FOREIGN PATENT DOCUMENTS

| 477222 | 12/1990 | European Pat. Off. |
| 676725A2 | 10/1995 | European Pat. Off. |
| 03271877 | 12/1991 | Japan |
| 05298460 | 11/1993 | Japan |

OTHER PUBLICATIONS

"Faster Phong Shading Via Angular Interpolation" by A.A.M. Kuijk and E.H. Blake, pp. 315–325, 1989.
"Hardware Supported Bump Mapping: A Step Towards Higher Quality Real–Time Rendering" by I.Ernst, D.Jackel, H.Rüsseler and O.Wittig, pp. 63–70, 1996.

*Primary Examiner*—Phu K. Nguyen
*Attorney, Agent, or Firm*—Kane, Dalsimer, Sullivan, Kurucz, Levy, Eisele and Richard, LLP

[57] ABSTRACT

A computer graphics circuit for rendering light-reflected images based on a bump-mapped Phong-shading model implemented fully in hardware, comprises a span processor, a bump-mapping circuit, a reverse-projection circuit, a bump-normal RAM, and Phong-shading circuit. The surface and bump normal of each polygon is defined by horizontal and vertical angles relative to the eye-point axis in device coordinates and to an axis perpendicular to a texture mapping coordinate, respectively. The trigonometric function tables used for rotation and shading computation have an angle-range around either a horizontal or vertical angle. The surface normal of horizontal and vertical angles is rotated by the bump normal and given rotated horizontal and vertical angles to the shading circuit. The shading circuit further comprises and accumulator for multiple light-sources and spot-lighting, which has no limitation of the number of light-sources. The bump-mapped shading circuit is combined with a rotation-matrix multiplier and a shading circuit using trigonometric function tables of angle variables.

12 Claims, 10 Drawing Sheets

COMPUTER GRAPHICS CIRCUIT

This is a continuation-in-part of copending application International Application PCT/JP96/00726 filed on Mar. 21, 1996 and which designated the U.S.

FIELD OF THE INVENTION

1. Field of the invention

The described invention provides a computer graphics circuit to render image of light-reflected shading. The circuit is concerned in particular with Phong-shading with diffuse and specular reflection, and bump-mapping to express a wrinkled or dimpled surface without geometric shape modeling. The bump normal is defined with two-dimensional pattern and stored in memory device. It is mapped onto the surface of arbitrary direction. This technology is applied to the rendering processor of a virtual reality and multimedia system (e.g., amusement, simulation) to animate realistic images in real-time.

2. Background Art

§ 1. Background art of Phong shading circuit

Phong-shading is a typical light-reflection model in computer graphics. To design the Phong-shading circuit in hardware needs following processing; defining surface and light-source normals, calculating diffuse and specular reflections, and combining these two reflective intensities. In conventional approach, there was a circuit to define the normal of surface with angular parameter of horizontal and vertical angles relative to eye-point axis. The circuit based on this definition was simple due to a necessity of only one set of memory device for each angle. In the Phong shading model, reflection intensity Ip is defined by addition of diffuse and specular reflection intensities. In conventional methods, a horizontal reflection component Iph and a vertical reflection component Ipv were calculated independently and added these two at final processing. To combine the horizontal and vertical intensities as a mean value, however, has a serious calculation-error at specified angles (e.g., 0 and 90 degrees). This invention is done to provide a Phong shading circuit in order to minimize above error.

§ 2. Background art of Bump mapping circuit

Bump-mapped shading is obtained by following processing; defining bump-normal, mapping the bump-normal onto surface, and calculating diffuse and specular reflection intensities with intensity of light-source and reflection angle against the surface. To map a colored pattern-texture onto surface using hardware circuit has been known, however, there is no practical circuit now for bump mapping. In practice it has been primarily implemented in software or parallel processing architecture using multiple arithmetic elements. Thus, it is very difficult to get a rendering speed around million polygons per second in conventional schemes.

This invention is carried out to establish the hardware circuit of bump-mapped shading with a rendering speed within a single clock, including the calculation combined with bump-mapping and Phong shading. The single clock of rendering speed means that a calculation result can be obtained asynchronously and it takes only delay-times for switching speed of circuit.

This invention is useful for virtual reality system which needs an animated image in real time.

SUMMARY OF THE INVENTION

This invention of claim 1 specifies a bump-mapped shading circuit comprising: (1) span processors to fill the polygon by interpolating attributes and coordinates defined at each polygon vertex, (2) a reverse-projection circuit (texture mapping circuit) and bump-pattern RAM (random access memory), which stores a function table of bump normals in a two-dimensional array, (3) a bump-mapping circuit which rotates the surface angle with the bump-mapping angle, and (4) a shading circuit to compute the diffuse and specular intensity of the bump-mapped surface reflecting multiple light-sources.

In the above-described system, the normal vectors of the polygon-surface, light-sources, and bumps are defined by two values, horizontal and vertical angles. Surface normals and light-sources are defined with angles relative to the eye-point axis in device coordinates, and bumps are defined relative to the axis perpendicular to the texture mapping address. The Phong shading model is formulated with the trigonometric functions which include either horizontal or vertical angles.

Surface angle and texture coordinates are given for each polygon vertex and interpolated along the outline of the polygon first. Then span processors interpolate these attributes and coordinates inside each polygon. The bump-angle stored in RAM is read by the address given by the reverse-projection circuit. The bump-mapping circuit receives both the surface angle from the span processor and the bump-angle from the RAM and rotates the surface angle with bump-angle.

The rotated surface angle determined by the bump-mapping circuit is given to the shading circuit, implemented with diffuse and specular reflection circuits, which compute the reflected intensity on the surface illuminated by the light-sources. This computation is carried out for every point on the polygon-surface, synchronized with the execution of the span processor. The surface shading is obtained by multiplying the reflected intensity with the texture pattern color.

The invention of claim 2 defines the array of the bump-pattern in the same 2D coordinates as the texture pattern. This pattern-coordinate is defined at each polygon vertex not only for the texture but also bump-mapping, and applied simultaneously to both texture pattern and bump-angle RAMs, after the address is projected reversely to the texture pattern coordinate from the device coordinate which a perspective projection may be applied.

The invention of claim 3 uses the memory-table for bump-normal rotation to define trigonometric functions of either horizontal or vertical surface angle input-variables for rotation of bump normal with surface normal in the bump mapping circuit.

The invention of claim 4 handles the lighting in the shading circuit with the memory tables, multipliers and adders. The memory tables which receive either horizontal or vertical input-variables rotated the surface-normal with the bump-normal at the bump mapping circuit are used to define trigonometric functions.

The invention of claim 5 is to get the textured and bump-mapped shading surface by multiplying texture colors with red, green and red with shaded intensity at the bump-mapped shading circuit.

The invention of claim 6 comprises the RAMs for specular exponent table and trigonometric function tables which includes the light-source components while the ROM for trigonometric function table which includes only normal component of surface or bump.

As per the above description, this invention provides real-time rendering of light-reflected three dimensional images in a hardware implementation with a small-scale circuit and with small errors. To implement the bump-mapping processing in hardware brings several thousands of higher speed than the processing by software.

DETAILED DESCRIPTION OF THE PREFERRED IMPLEMENTATIONS

§ 1. Shading circuit

This invention defines the normal vector of surface and light-sources as horizontal and vertical angles relative to eye-point axis in device coordinates. Equations in a conventional expression using normal vectors can be rewritten as trigonometric functions of only one variable, either the horizontal or vertical angle of surface and light-source. To use these angle-values, the cosines can be expressed as:

$$\cos\theta = \cos N_v \times \{\cos L_v[\cos(L_h-N_h)-1]\} + \cos(L_v-N_v) \quad (1)$$

$$\cos\alpha = 2\cos N_h \times \cos N_v \times \cos\theta - \cos L_h \cos L_v$$

$$\cos\alpha \approx (\cos\theta + \cos N_h \cos N_v)/2 \quad (2)$$

where $N_h$ and $N_v$ are the horizontal and vertical angles of the surface normal, respectively, and $L_h$ and $L_v$ are the horizontal and vertical angles of light-source normal, respectively. Equations (1), (2), and (3) do not contain combinations of multiple angle-components in division or multiplication forms such as $N_h/N_v$ or $N_h \times N_v$ in the trigonometric functions.

The mathematical model of Phong-shading is expressed with following equation:

$$I = I_a + I_p = I_a + I_d \cos(\theta) + I_r \cos^n(\alpha) \quad (3)$$

where $I_a$ is ambient light, $I_p$ is reflected light, $I_d$ and $I_r$ are diffuse and specular reflection coefficients respectively, n is the specular exponent, $\theta$ is the angle between the light-source and surface normal, and $\alpha$ is the angle between a mirror-reflected direction relative to the surface normal and the viewing direction. Overall intensity can be obtained by adding environmental or ambient light $I_a$ to reflected light $I_p$. Intensity $I_p$ is computed at all points of a polygon surface using the interpolation scheme for coordinates, normal vectors and other attributes being defined at the polygon vertices.

The variable-range of $N_h$ and $N_v$ is chosen to be about 10 bits. Thus, each trigonometric function has 1024 words RAM or ROM. (If two angle-variables were combined, the variable-range becomes 20 bits and 1 Mbit RAM is needed, difficult to implement in an ASIC.) The concatenated values of multiplied trigonometric functions, such as $\cos N_h \cos N_v \cos\theta$, are rounded-off to the specified significant bit-length corresponding to the necessary accuracy of image quality. The trigonometric functions in equations (1) and (2) contain the light-source angles $L_h$ or $L_v$ with $N_h$ or $N_v$. However, the light-source normal can be regarded as a unique and constant-value every video-frame cycle in the parallel lighting. Thus, all trigonometric functions in equations contain a single variable. The circuit based on equations can be implemented with memory devices, multipliers and adders. The $\cos^n\alpha$ is defined by a RAM table.

Figure 1:
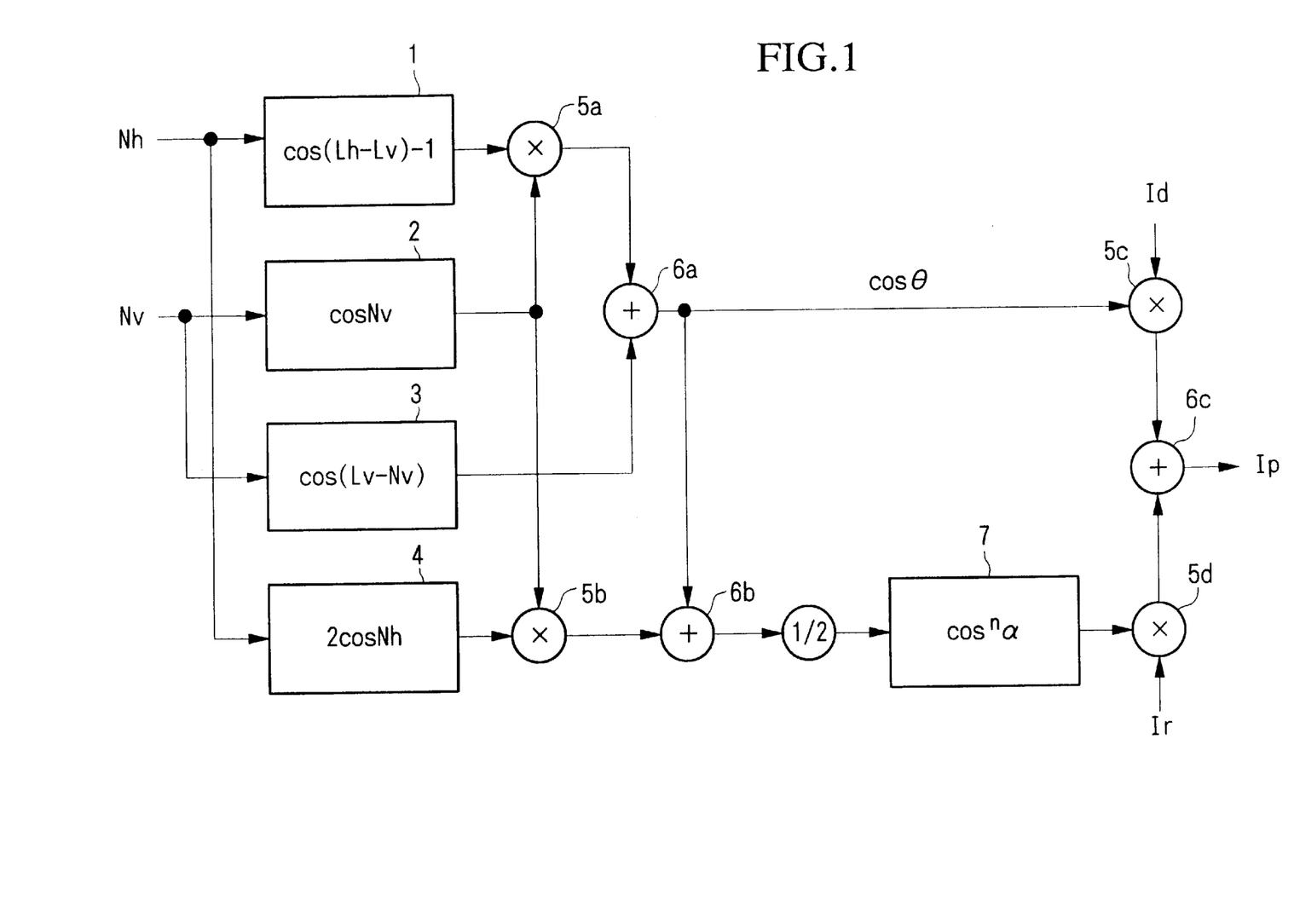
FIG. 1 is a block diagram of the Phong-shading circuit in a parallel light-source system.

Attention is directed to FIG. 1 which shows the Phong-shading circuit of the invention based on equations (1), (2), and (3). Input variables in the circuit are the horizontal angle $N_h$ and vertical angle $N_v$ of the surface normal. This circuit computes $\cos\theta$ and $\cos\alpha$ using memory devices 1–4, multipliers 5a and 5b, and adders 6a and 6b. Memory devices 1 and 3 are RAMs. RAM1 and RAM3 store the terms of equation (1), $\cos L_v[\cos(L_h-N_h)-1]$ and $\cos(L_v-N_v)$, respectively. Memory devices 2 and 4 consist of ROM and store $\cos N_v$ and $\cos N_h$, respectively.

The adders 6a and 6b output $\cos\theta$ and $2\cos\alpha$, respectively. The diffuse reflection term is obtained by multiplying $\cos\theta$ with the diffuse coefficient $I_d$. The specular reflection term can be obtained by multiplying the specular coefficient $I_r$ with the $\cos\alpha$ output from RAM7. RAM7 stores the cosine-exponent table of $\cos^n$. The output values of $\cos\theta$ and $\cos^n\alpha$ have double bit-length at the multiplier of 5a or 5b, rounded to the specified significant bit-length. In the case that high accuracy is needed under high-specular exponent value, a linear interpolation approximation scheme can be employed using RAMs and multiplier instead of RAM7. As described by equation (1), intensity with the Phong-shading model is obtained by the addition of $I_d\cos\theta$ and $I_r\cos^n\alpha$.

§ 2. Bump-mapping circuit

Bump-mapping rotates the surface normal (angle) with a bump normal. Interpolation for polygon filling is applied to the coordinates, texture mapping address, surface angle, and light-source angles (in a multiple light-source system). The bump-pattern is allocated in two dimensional u,v coordinates with a functional variable defined by horizontal and vertical angles, $B_h$ and $B_v$, relative to the the axis perpendicular to u,v coordinates. This pattern is stored in the RAM. The bump-mapped surface may be scaled and applied a perspective projection, which needs to invert the u,v device-coordinates to texture coordinates. After this reverse-projection computation, the address is applied to the bump-pattern RAM. This address is the same as that applied to the texture pattern RAM. However, maintaining the same significant bit-length as the texture pattern address is not necessary, due to differences in resolution.

The bump-mapping circuit rotates the $N_h$ and $N_v$ angles with $B_h$ and $B_v$ to obtain angles $N'_h$ and $N'_v$. This invention represents the rotation function with a trigonometric function of one variable, either $B_h$ or $B_v$. This equation is given by following equations:

$$N'_v = \arcsin(\cos N_v \sin B_v + \sin N_v \cos B_h \cos B_v) \quad (4)$$
$$N'_h = \arcsin\sin B_h \cos B_v / \sqrt{1-\sin^2 N'_v} + N_h$$

where $$\beta = \arccos(\sin|B_h| \cos B_v) \cdot \sin B_h$$

$$m = \arcsin(\sin B_v/\sin|\beta|) \quad (5)$$

putting $\sin B_h$ as following:

$$\begin{array}{ll} 1 & B_h > 0 \\ 0 & B_h = 0 \\ 1 & B_h < 0 \end{array}$$

then equation (4) is transformed by following equations:

$$N'_h = \arcsin\left(\cos|\beta| / \sqrt{1 - \sin^2 N'_v}\right)s(-1)^u + (-1)^s u\pi + N_h \quad (6)$$

$u: 0 \mid N_v + m \mid \le \pi/2$
$1 \mid N_v + m \mid > \pi$
$s: 0 - \beta \le 0$
$1 - \beta > 0$ putting $t = \sin(N_v + m)\sin|\beta|$,
$N'_h = N_h + \arcsin\left(\cos|\beta| / \sqrt{1 - t^2}\right)s(-1)^u + (-1)^s u\pi$
$N'_v = \arcsin(\sin(N_v + m)\sin|\beta|)$ Equations (5) is a function defined by the horizontal $B_h$ and vertical $B_v$ angles of the bump normal and these two modified angle-variables, $\beta$ and m, are stored in the bump pattern RAM instead of $B_h$ and $B_v$ to reduce circuit complexity. In equation (6), $N'_h$ and $N'_v$ are represented by trigonometric functions such as $\sin(N_v+m)$, $\sin\beta$, $\cos\beta$, and t, where the significant bit-lengths of variables in the trigonometric functions take the range of one angle or an angle plus 1 bit, allowing circuit implementation with trigonometric function-tables using small-capacity memory devices. As shown in equation (6), all of the trigonometric function table in the bump-mapping circuit can be implemented with ROMs.

Figure 2:
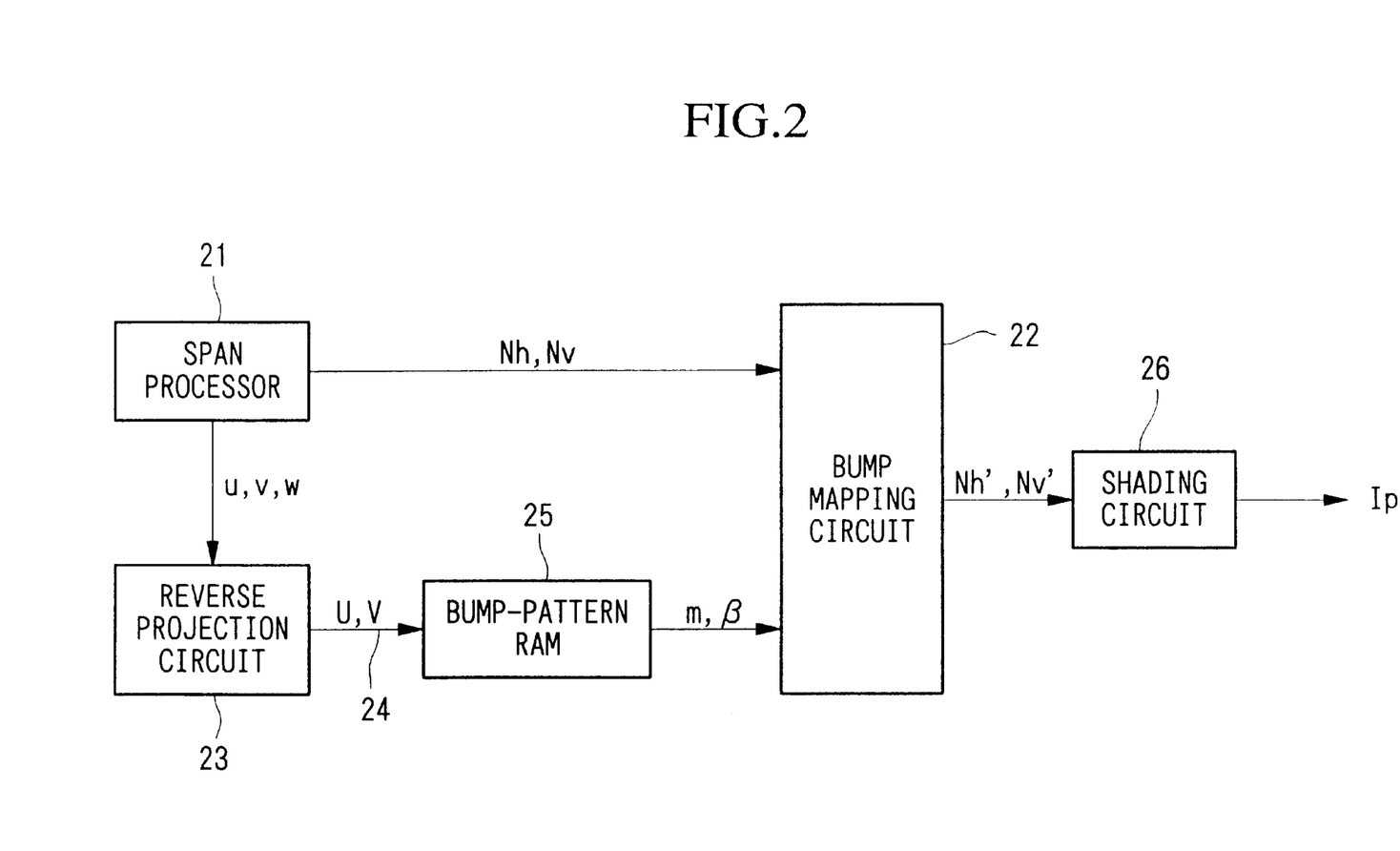
FIG. 2 is a block diagram of the bump-mapped shading circuit illustrating data-flow and total organization.

Attention is directed to FIG. 2 which shows the block diagram of a bump-mapped shading circuit. Circuit 21 is a span processor which interpolates the surface angle $N_h$ and $N_v$, and texture coordinates u,v. The $N_v$ and $N_h$ parameters are passed to bump-mapping circuit 22, while u,v coordinates are given to the reverse-projection circuit 23, which transforms the u,v address to texture coordinates. The reverse-mapped address 24 is then applied to the bump-pattern RAM25. In the pattern RAM, $\beta$ and m are stored instead of the $B_h$ and $B_v$ to avoid computation of equation (5). The output data of RAM 25 is transfered to the bump-mapping circuit synchronizing with the generation of DDA of $N_h$ and $N_v$ in span processor 21.

In a perspective projection system, the reverse-projection transformation is applied to $N_h$ and $N_v$ because these angles are defined in device coordinates. If the normal vector is not applied to perspective transformation in mapping the world coordinate system to the device coordinate system, application of the reverse-projection transformation for $N_h$ and $N_v$ is not needed.

The modified bump-angle variables, $\beta$ and m are applied to the bump mapping circuit in FIG. 2. At this time, the filtering for scaling may be applied. In circuit 22, operations based on equation (6) are executed, outputting $N'_h$ and $N'_v$, which are rotated the $N_h$ and $N_v$ with the $B_h$ and $B_v$. $N'_h$ and $N'_v$ are given to shading circuit 26, which is equivalent to the circuits of FIGS. 1.

Figure 3:
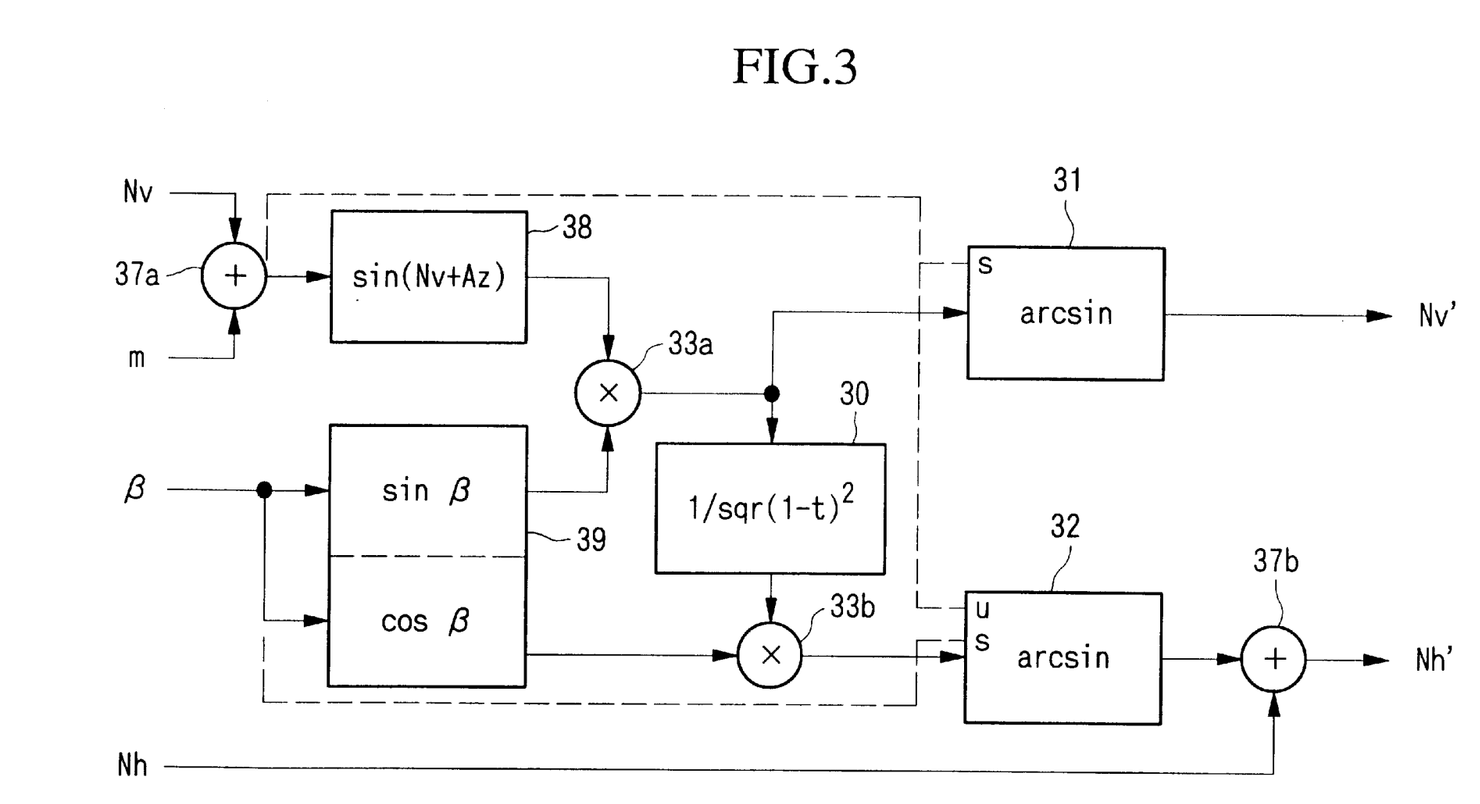
FIG. 3 is a block diagram of another example of the bump-mapping circuit.

Attention is directed to FIG. 3 which shows the bump-mapping circuit in the invention. The circuit is based on equation (6). The trigonometric function-tables of 38, 39, 30, 31 and 32 consist of memory devices. These memory devices could be based on RAM, but ROM is used for all memory tables. The surface angle $N_v$ and bump-angle m are added at adder 37a and applied as ($N_v$+m) to the sine ROM38. Bump-angle $\beta$ is applied to ROM39, which stores $\sin(\beta)$ and $\cos(\beta)$ separately. At multiplier 33a, $t = \sin(N_v+m) \sin(\beta)$ is obtained, which is then applied to ROM30, which stores the function $1/\sqrt{1-t^2}$. $N'_v$ is obtained to apply the output data of multiplier 33a to arcsin ROM31. $N'_h$ is obtained to multiply $\cos\beta$ with the output data of ROM30 at multiplier 33b and applied to the arcsin ROM32 before adding to $N_h$ at adder 37b. The upper bit of angle-value is used for the sign of equation (6), so that the table is shared according to the upper bit. As shown in FIG. 3, there is no feedback loop in the bump-mapping circuit. It can output the result with only the delay of memory devices, adder and multipliers. Thus, the bump-rotated angle can be obtained within a clock cycle.

§ 3. Bump-mapped shading circuit

Rotating the bump normal with the surface normal and rotating the surface normal with the bump normal are equivalent. Thus, if the bump normal represents a 3-axis component using the horizontal $B_h$ and vertical $B_v$ angles, a rotated angle is given by the rotation-matrix as follows:

$$\begin{bmatrix} X1 \\ Y1 \\ Z1 \end{bmatrix} = \begin{bmatrix} \cos(N_h) & 0 & \sin(N_h) \\ 0 & 1 & 0 \\ -\sin(N_h) & 0 & \cos(N_h) \end{bmatrix} \begin{bmatrix} 1 & 0 & 0 \\ 0 & \cos(N_v) & \sin(N_v) \\ 0 & -\sin(N_v) & \cos(N_v) \end{bmatrix} \begin{bmatrix} X0 \\ Y0 \\ Z0 \end{bmatrix} \quad (7)$$

$X0 = \sin B_h \cos B_v;\ Y0 = \sin B_v;\ Z0 = \cos B_h \cos B_v$

The trigonometric functions in the above matrix parameters contain one variable of either horizontal or vertical angle, so that the circuit can be designed with small memory size. For shading computation, diffusion angle $\cos\theta$ and specular angle $\cos\alpha$ in Phong-shading are given by following equations:

$\cos\theta = X1 \cos L_h/\sin L_h + Y1 \sin L_v$ $\cos\alpha \approx (\cos\theta + Z1)/2 \quad (8)$ Using equations (7) and (8), the circuit is implemented with memory devices, multipliers and adders, which output bump-mapped shading pixels at every clock cycle.

Figure 4:
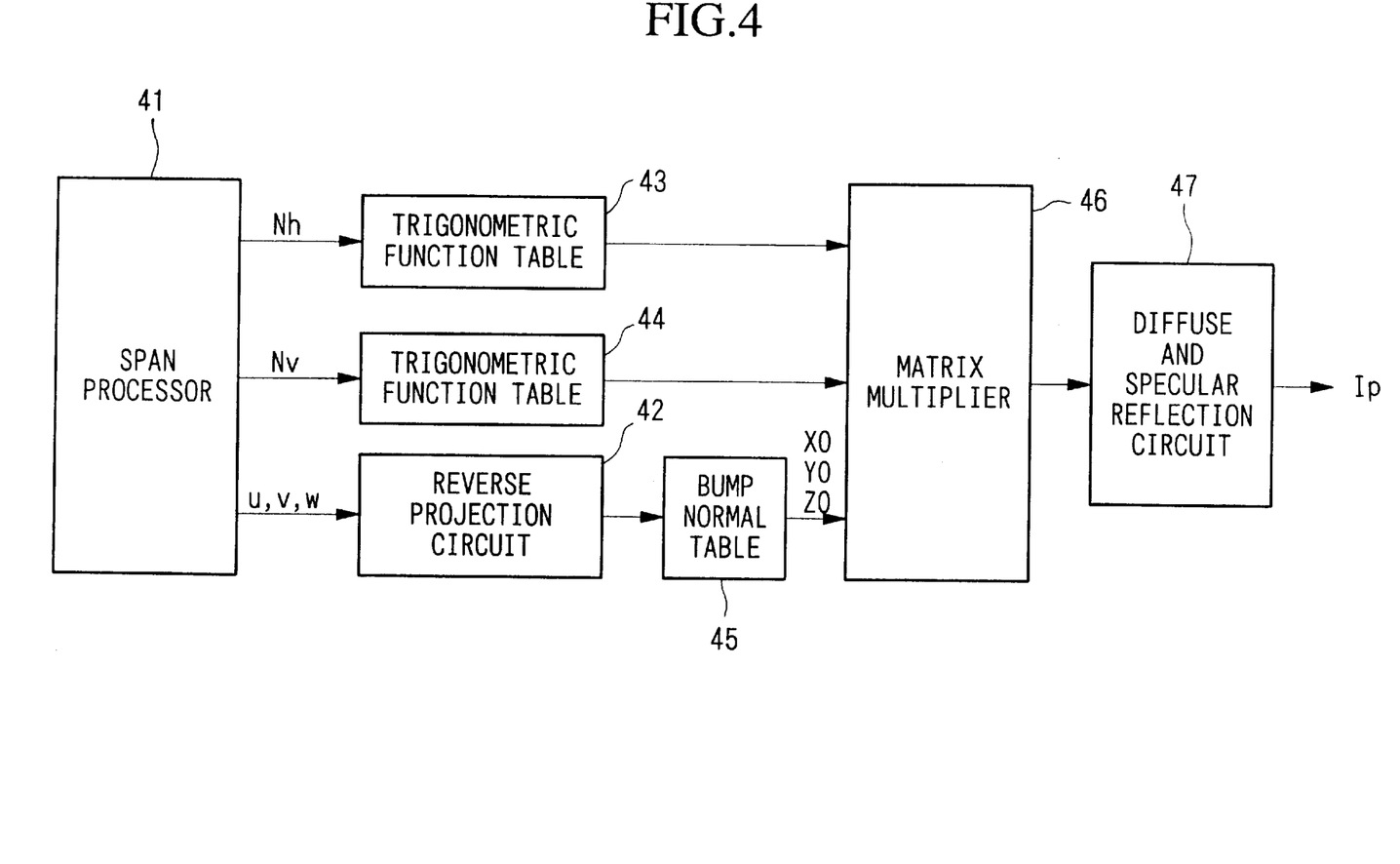
FIG. 4 is a block diagram of the bump-mapped shading system using rotation matrix and vector forms for the rotation of surface and bump normals.

FIG. 4 shows the circuit of the invention. In FIG. 4, span processor 41 outputs the angle values $N_h$ and $N_v$ of surface and the u,v texture address. The u,v address is applied to the reverse-projection circuit 42 where outputs the address to the RAM45. RAM45 stores the values of the bump-angle function, X0, Y0 and Z0 in equation (7). $N_h$ and $N_v$ are applied to the trigonometric function-tables 43 and 44, respectively. The outputs of tables 43 and 44 are given to the rotation-matrix multiplier 46 as parameters in the matrix of equation (7), obtaining the cosines of diffuse and specular reflection. These cosines are multiplied with texture pattern color in circuit 47.

Figure 5:
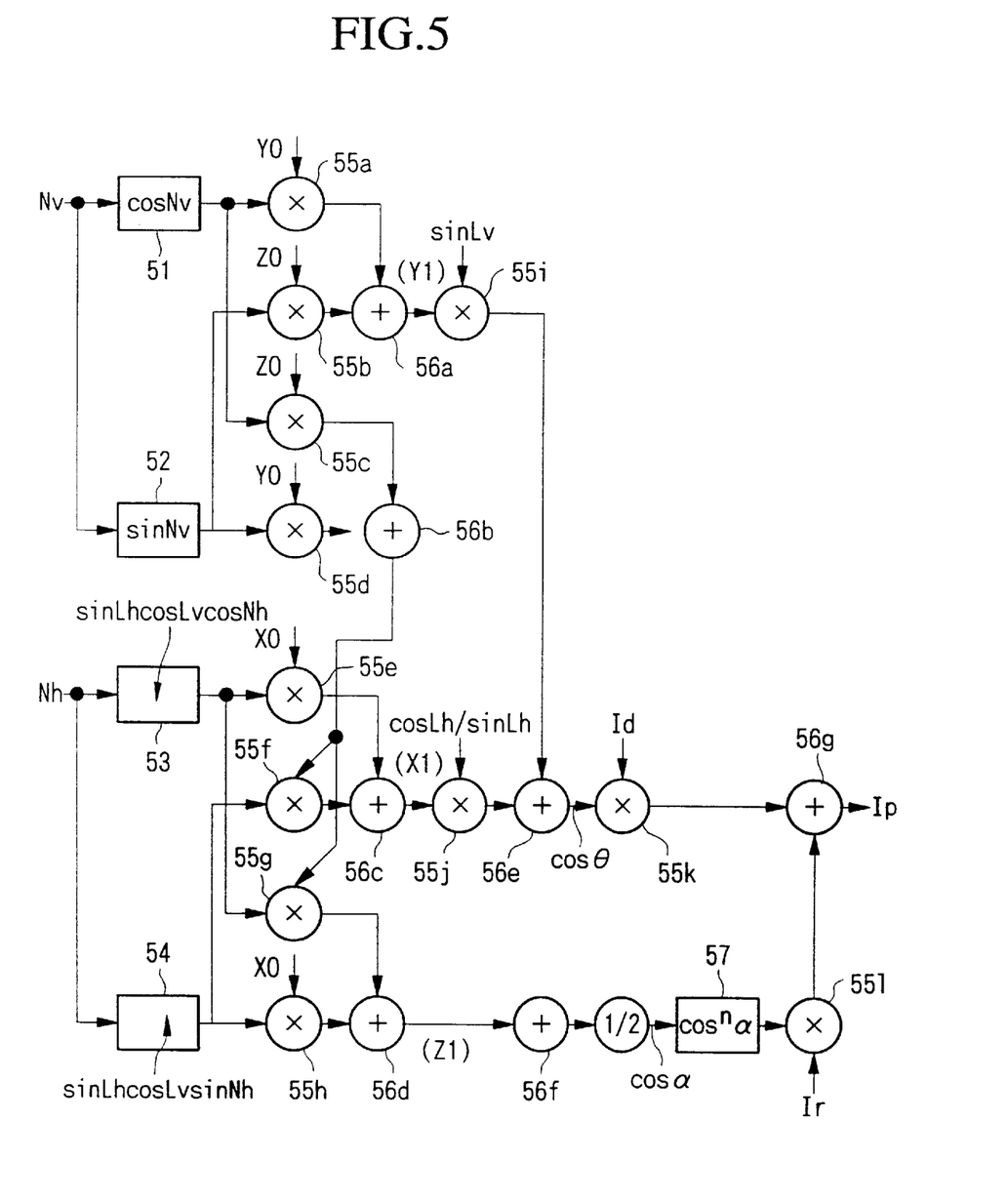
FIG. 5 is a block diagram of the detailed circuit of FIG. 4.

Attention is directed to FIG. 5, which shows the circuit in this invention based on FIG. 4. In FIG. 5, surface angles $N_h$ and $N_v$ are applied to trigonometric function tables 51–54, where ROM51, ROM52, RAM53 and RAM54 store $\cos N_v$, $\sin N_v$, $\sin L_h \cos L_v \cos N_h$, and $\sin L_h \cos L_v \sin N_h$, respectively. These output data are applied to multipliers 55a–55h and multiplied with X0, Y0 and Z0, based on equation (7). The output data of multipliers 55a–55h are then applied to adders 56a–56d, respectively, to obtain X1, Y1 and Z1 in matrix equation (7). X1 and Y1 are multiplied by $\cos(L_h)/\sin(L_h)$ and $\sin(L_h)$ at multipliers 55j and 55i, respectively, and then $\cos\theta$ and $\cos\alpha$ are obtained via adders 56e and 56f, respectively. The ½ coefficient in FIG. 5 shows the 1 bit shift-down circuit. In FIG. 5, it is obvious that RAMs 53 and 54 can be replaced with ROMs if the $\sin L_h$ and $\cos L_v$ are replaced with ROM tables and multipliers.

The data of RAM 1 and 3 in FIG. 1 contain the variable of light-source angles $L_h$ and $L_v$. Thus, $\cos(L_h - N_h) - 1$ function in RAM1 and cos($L_v$–$N_v$) function in RAM3 must be loaded every time the light-source position is changed. In spot-lighting $L_h$ and $L_v$ are changed across surface position. In the case of multiple light-sources, multiple RAMs corresponding to the number of light-sources are needed. The light-source variable must be excluded from the table definition of RAM1 and RAM3 in such systems.

Figure 6:
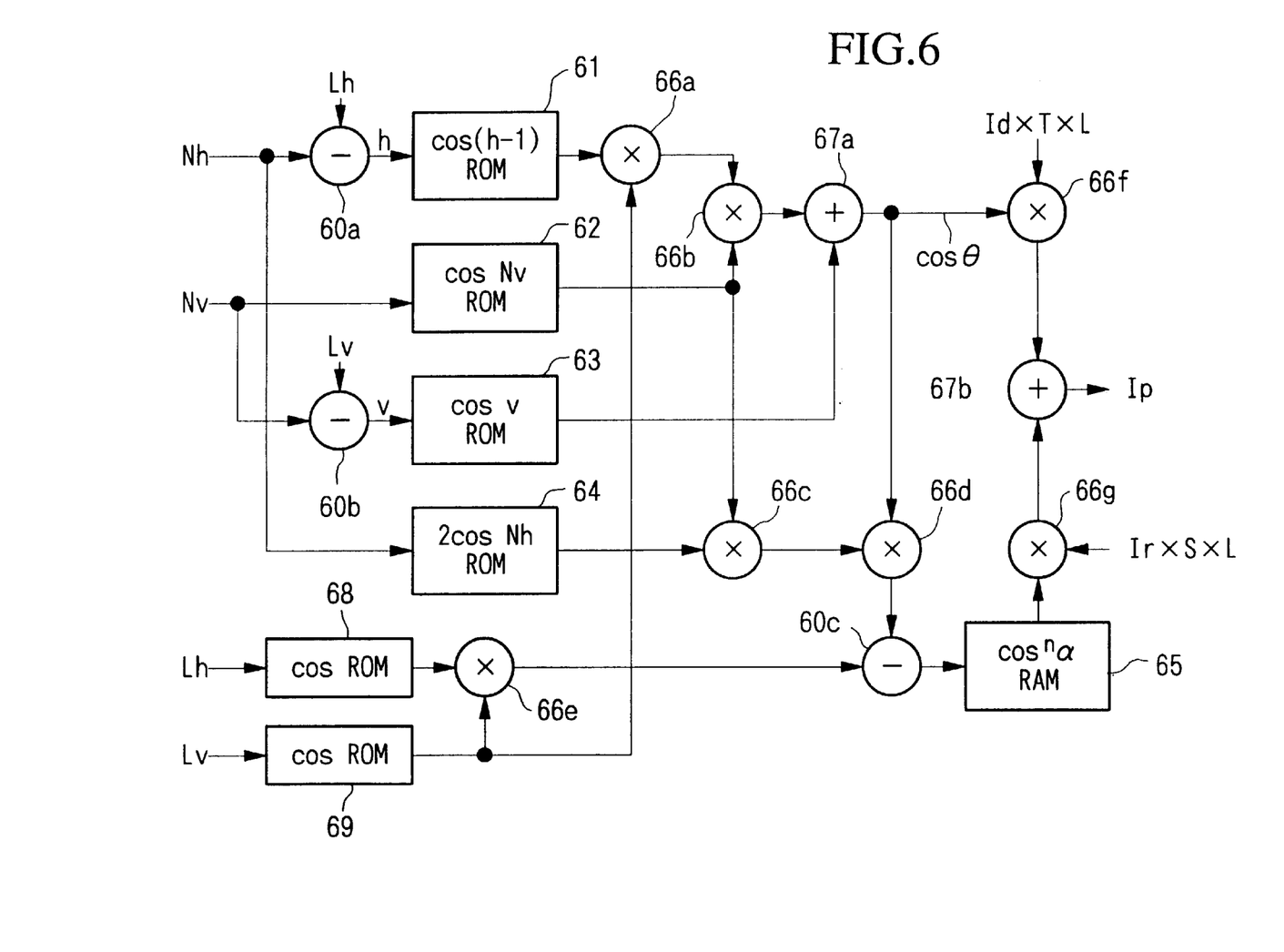
FIG. 6 is a block diagram of the Phong-shading circuit in a multiple light-sources or spot-lighting system.

Attention is directed to FIG. 6 which shows another example of a Phong shading circuit. The circuit of FIG. 6 is based upon equations (1), (2), and (3). The cosα is used the former equation. The equation terms ($L_h$–$N_h$) and ($L_v$–$N_v$) are computed separately by subtracters 60a and 60b, and then applied to memory devices 61 and 63, respectively, implemented with ROM. The cos $L_v$ term from ROM69 is multiplied with the output data of ROM61 at multiplier 66a to obtain cos $L_v$[cos($L_h$–$N_h$)–1].

The light-source term—cos$L_h$cos$L_v$ in equation (2) is obtained by multiplication (at 66e) of the output of ROM68 with cos$L_v$. It is subtracted (at 60c) from the output data of multiplier 66d to get the specular reflection variable cosα. The memory tables of FIG. 6 are implemented with ROMs except for table 65. The diffuse cosine is multiplied with texture color T, light-source color L and diffuse coefficient $I_d$ at multiplier 66f. The specular cosine is multiplied with specular color S, light-source color L and specular coefficient $I_r$ at multiplier 66g. These diffuse and specular intensities are added and output Phong-shaded intensity $I_p$ at adder 67b. This circuit can apply light-source variables $L_h$ and $L_v$ concurrently with surface normal to the shading circuit, enabling shaded images with an unlimited number of light-sources or spot-lights.

Figure 7:
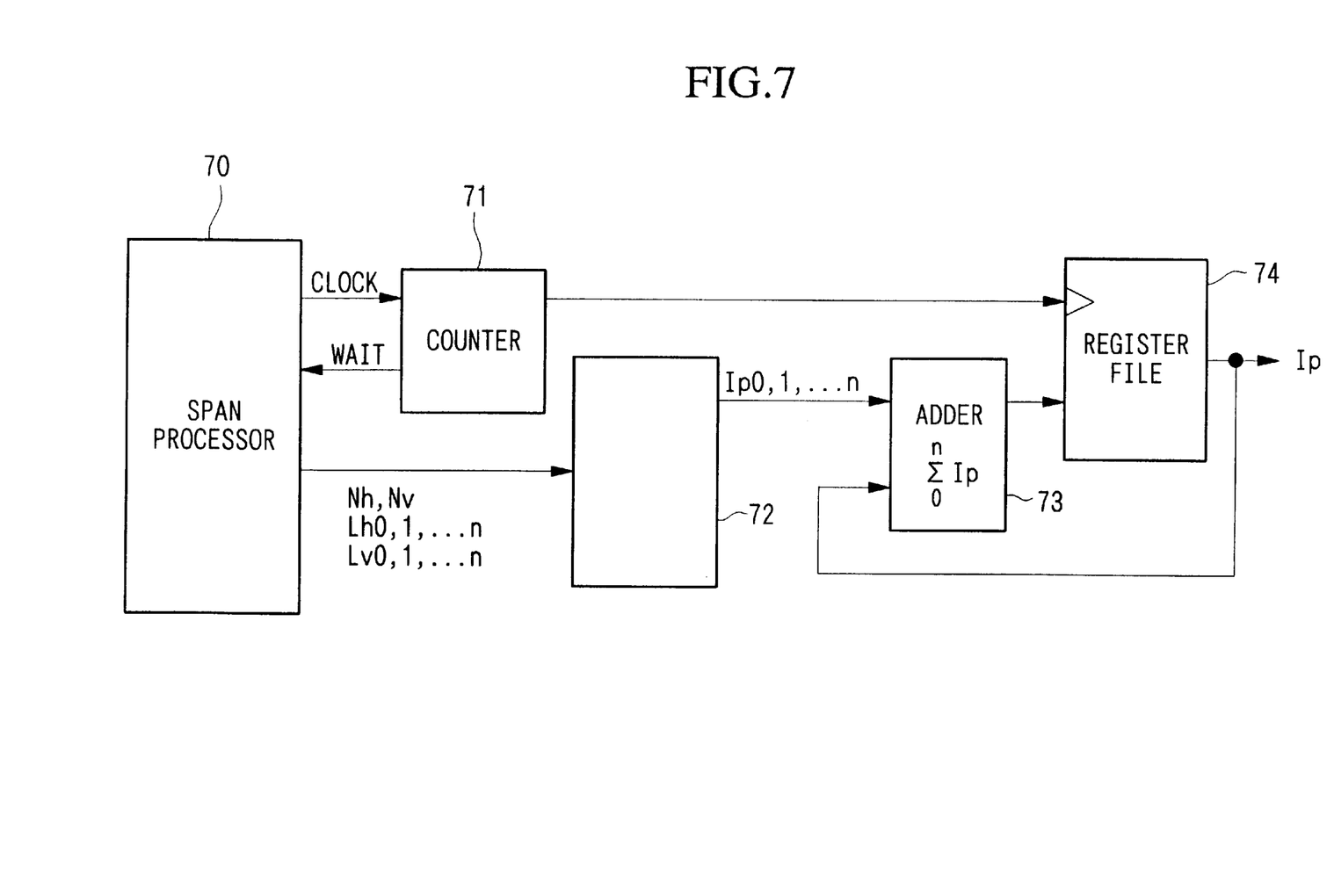
FIG. 7 is a block diagram of the Phong-shading circuit in a multiple light-sources system with accumulator.

Attention is directed to FIG. 7, which shows the circuit to generate a shaded image under multiple light-sources. The span processor 70 with multiple DDAs (digital differential analyzer) outputs the surface angles $N_h$ and $N_v$ and the array of light-sources, $L_h$[0,1, . . . , n] and $L_v$[0,1, . . . , n]. These data are applied to circuit 72, which was shown in FIG. 6. The array of light-source angles is given cyclically after every change of surface-position. Diffuse and specular reflection terms are computed for every light-source input and the circuit outputs the intensity $I_p$[0,1, . . . , n]. These intensities are accumulated by adder 73 and register 74. Counter 71 performs a synchronization-control of span processor 70 in order to output the n-array of light-source angles across the surface angles. The circuit in FIG. 7 can calculate Phong-shaded intensities with multiple light-sources with small extensions to circuits 71, 72, and 74.

Figure 8:
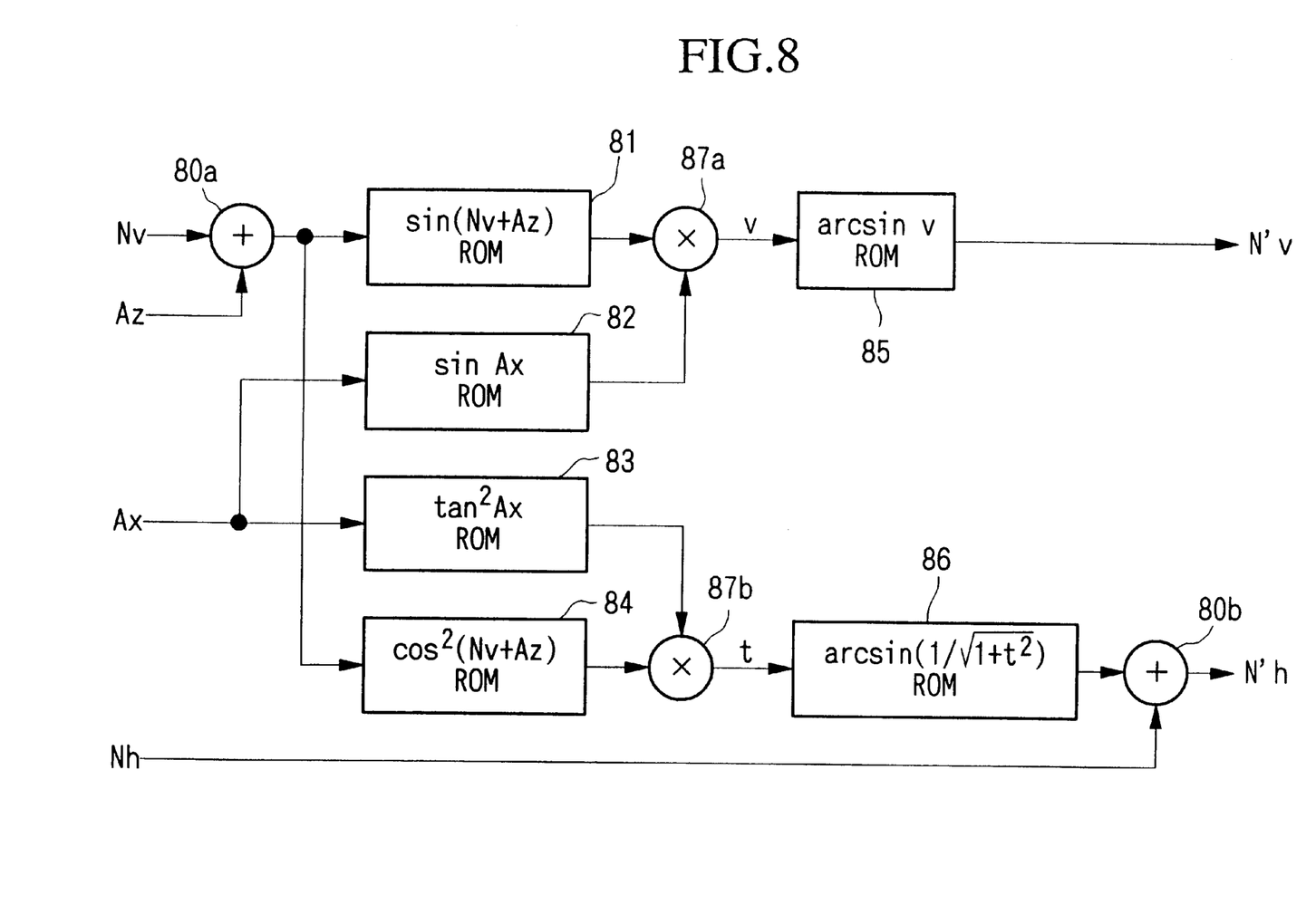
FIG. 8 is a block diagram of another example of the bump-mapping circuit in FIG. 2.

Attention is directed to FIG. 8 which shows another example of a bump-mapping circuit. In the $N'_h$ of equation (6), the $\cos\beta/\sqrt{1-t^2}$ term becomes infinite at β=90 deg. The system could define an approximate value for such critical conditions, but, to avoid error, equation (6) can be modified to $1/\sqrt{1+w^2}$, where w=$\tan^2\beta\cos^2$($N_v$+m). In FIG. 8, $N_v$ and m are added by 80a and applied to sin ROM81. This output is multiplied with the sinβ ROM82 at multiplier 87a. $N'_v$ is obtained by applying the output data of multiplier 87a to arcsin ROM85. For $N'_h$, w=$\tan^2\beta\cos^2$($N_v$+m) is first computed by multiplying the $\tan^2\beta$ output of ROM 83 of with the $\cos^2$($N_v$+m) output of ROM84 at multiplier 87b. This is applied to the ROM of arcsin($1/\sqrt{1+w^2}$) and then added to $N_h$ at adder 80b. There is no infinite state in the circuit of FIG. 8.

The bump-mapped surface-normal is obtained by rotation of the bump normal relative to the surface normal. In a case that surface is flat and rotated around a surface normal, the bump normal is not changed relative to a eye-point axis despite the fact that the bump-mapped position on surface is geometrically changed. To avoid this condition, it needs a definition of up-vector(normal) for bump pattern. This up-vector(rotation-angle relative to surface normal) can be calculated by u,v coordinates to divide the differences as following. tanβ=(v1–v0)/(u1–u0) where u0, v0 and u1, v1 are values on the polygon edges to be interpolated by DDAs.

Figure 9:
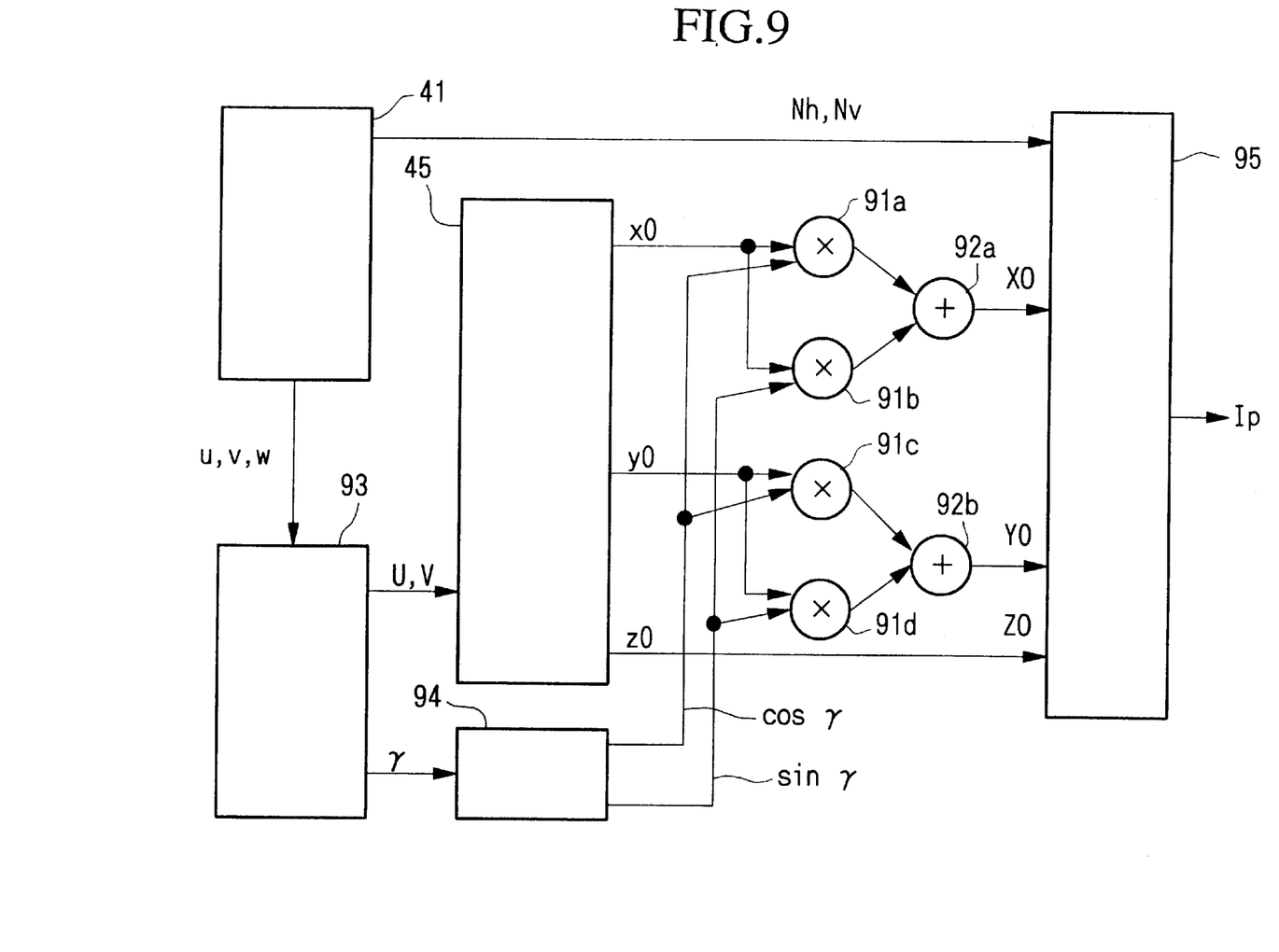
FIG. 9 is a block diagram of another example of the bump-mapped shading circuit of FIG. 4.

Attention is directed to FIG. 9, which shows the circuit in this invention based on FIG. 4. Span processor 41, and RAM 45 are the same circuits as 41 and 45 in FIG. 4 respectively. The reverse-projection circuit 93 generates U,V addresses from a u,v,w perspective projected coordinates. The U,V addresses are then applied to the bump normal RAM 45 to output bump angle function, X0, Y0 and Z0. In FIG. 9, reverse-projection circuit 93 also generates a up-vector (normal) angle γ and outputs to the trigonometric function-table 94 of cosine and sine. The cosγ and sinγ from ROM 94 are applied to multipliers 91a–91d and the output data from these multipliers are added at adders 92a–92b as shown in FIG. 9 and then applied the values of X0, Y0, and Z0 to the circuit 95 which is the same circuit of FIG. 5. The circuit employed multipliers 91a–91d and adders 92a–92b is a rotation circuit which rotates the input-coordinates of x0, y0, z0 by angle γ.

Figure 10:
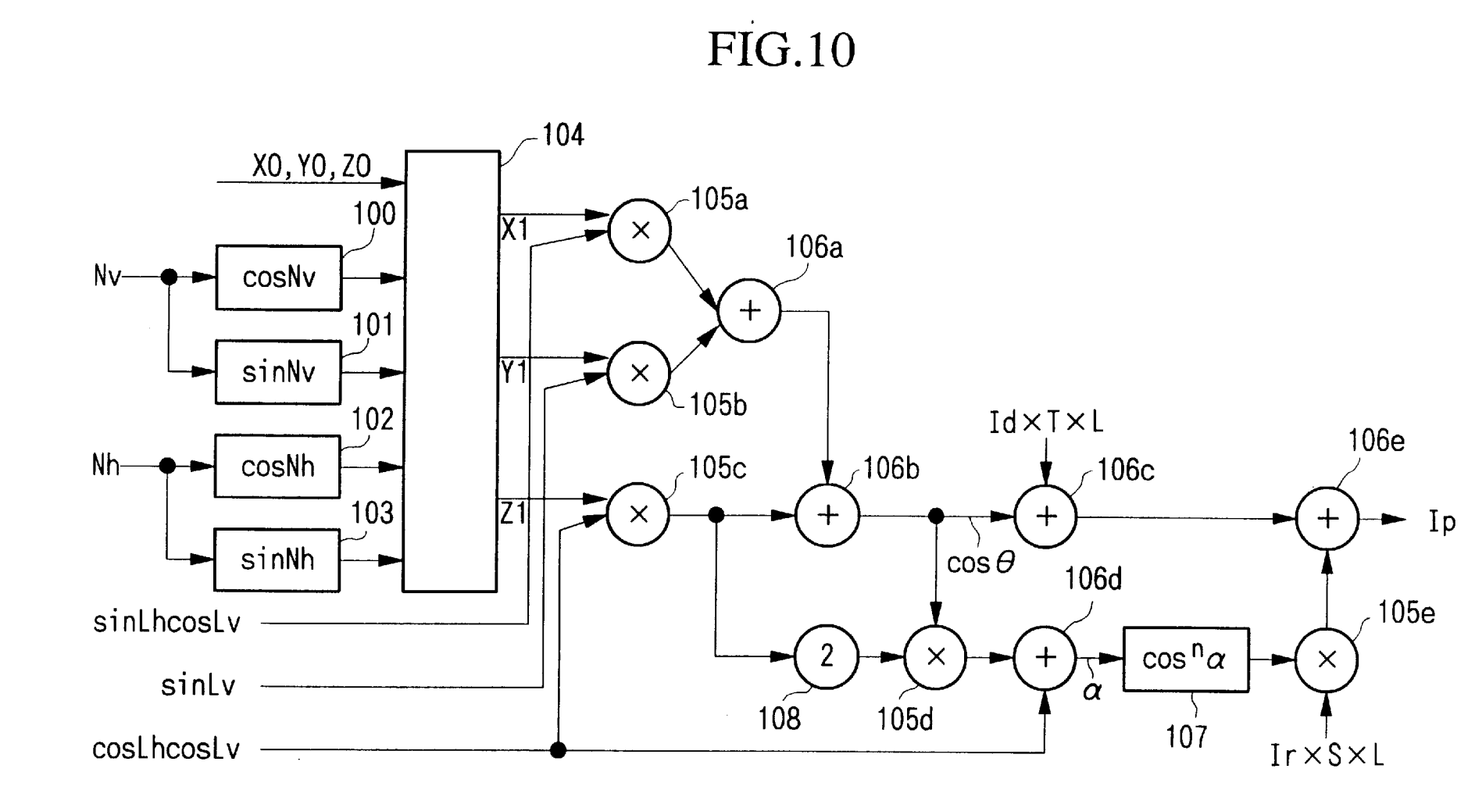
FIG. 10 is a block diagram of another example of the bump-mapped shading circuit of FIG. 4.

Attention is directed to FIG. 10, which shows another example of bump-mapped shading circuit based on FIG. 4.

FIG. 10 shows a partial circuit of 43 and 47 of FIG. 4. The difference from the circuit of Fig.5 is that the RAM 53 and 54 are replaced with ROM 102 and 103 which store cosNh and sinNh tables respectively. In this circuit, the light-source components based on Lh and Lv are applied to the rotated normal at output of matrix multiplier 104. The circuit 104 is a same circuit employed multipliers and adders as consisted of 55a–55h and 56a–56d in FIG. 5. The output data X1, Y1 and Z1 in FIG. 10 are concatenated with light-source variables sinLh cosLv, sinLv and cosLh cosLv at multipliers 105a–105c respectively and the output data are added with each other at 106a–106b as shown in FIG. 10. The α value is then obtained by multiplying cosθ with 2×Z1 at multiplier 105d and adding it with cosLh×cosLv at adder 106c. The 108 coefficient is the 1 bit shift-up register. RAM 107 stores a table of cosine specular exponent, The 105e and 105f are multipliers and 106d is a adder.

As per the above-described implementation, this invention has the features that (1) the normals for surface and light-source are represented with two angle values, horizontal and vertical angles relative to the eye point axis in device coordinates, and use trigonometric function tables with similar ranges of single angle variable (equations (1) and (2)), (2) the bump-pattern normals are defined by horizontal and vertical angles relative to the perpendicular to the u,v-axes and addressed with the same address as the texture pattern, storing its pattern as a modified bump normal value (equations (5) or (7)), (3) the bump-mapping circuit rotates the bump normal with the surface normal or rotates the surface normal with the bump normal before applying the shading circuit using the trigonometric function ROM tables.

This invention is applied for the arithmetic operation circuit of graphics processor to be used for amusement and computer simulation due to the use of small scaled ASIC. This technology provides an important visual technology of computer graphics to establish the virtual reality system.

What is claimed is:

1. A computer graphics circuit comprising a span processor for polygon filling by means of interpolation of coordinates and surface-normals defined at each polygon vertex, memory devices storing bump-normals and texture pattern, a bump-mapping circuit, and a shading circuit to compute a shading caused by light-sources, said bump-mapped shading circuit comprising;

means for defining surface and light-source normals with horizontal and vertical angles relative to an eye-point axis in device coordinates, defining a bump normal with two dimensional array in a same coordinate of texture pattern and storing said bump-normal into said memory device;

means for interpolating said coordinates and angles defined at said each polygon vertex for all insides of polygon;

means for reading out said bump-angle from said memory device by a texture address synchronizing with interpolation of span processor;

means for rotating said surface-angle with said bump-angle read out from said memory device;

means for applying said rotated horizontal and vertical angles to said shading circuit employed a diffuse-reflection and a specular-reflection circuits; and means for multiplying an intensity obtained by said shading circuit with said texture pattern to render a shade on texture-mapped surface.

2. A shading circuit as described in claim 1, wherein said means of storing the bump-angle into memory device, comprising:

means for arranging a position of said bump-angle in the same two-dimensional coordinates as the texture pattern coordinates, interpolating a surface in a device coordinate, computing a reverse-projective mapping-address, and reading out said bump-angle and texture pattern from said memory devices using said reverse-projective mapping-address.

3. Bump-mapped shading circuits described in claim 1, comprising:

means for rotating said surface-angle with said bump-angle using memory devices of trigonometric function in which each trigonometric function table for rotation is defined by one variable of either said horizontal or vertical angle.

4. Bump-mapped shading circuits described in claim 1, comprising:

means for implementing memory devices, adders and multipliers in said shading circuit, where said memory devices of trigonometric function store one variable of either said horizontal or vertical angle of surface-normal which is rotated by bump-angle at said bump mapping circuit.

5. Bump-mapped shading circuits described in claim 1, comprising:

means for multiplying intensity with said texture pattern in order to get a texture-mapped surface of bump-mapping, where said intensity is obtained at said shading circuit and said texture pattern is defined by color components of red, green and blue.

6. Bump-mapped shading circuits described in claim 4, comprising:

means for using RAM for said trigonometric function tables which are contained said light-source angles and specular exponent, and using ROM for said trigonometric function tables which contained only surface or bump-angle.

7. Bump-mapped shading circuits described in claim 1, comprising:

means for storing said bump-angle into a random access memory with a concatenated form of said horizontal and vertical angles;

means for reading out said concatenated form of bump-angle from said RAM using said reversed projection address in arbitrary significant bit-length corresponding to resolution of bump-quality;

means for implementing said bump-mapping circuit with trigonometric function tables which have a input variable of the concatenated value of further trigonometric functions, where each trigonometric function has one variable of either said horizontal or vertical angle; and means for using read-only-memory for said all trigonometric function tables in the bump-mapping circuit.

8. A shading circuit as described in claim 1 further comprising a multiple light-source circuit, said circuit further comprising:

means for concatenating both said light-source angle and surface angle before applying said light-source and surface angles separately to the memory of trigonometric function; and means for computing a shaded intensity for each of multiple light-sources sequentially and accumulating the shaded intensity using an adder and register, and outputting the accumulated intensity at every interpolated position of polygon.

9. A shading circuit as described in claim 8, further comprised of spot-lighting circuit, said further circuit comprising:

means for defining a light-source normal at each polygon vertex with normal vector, transforming a light-source normal to horizontal and vertical angles relative to an eye-point axis in device coordinates, interpolating said horizontal and vertical angles of light-source angle across the inside of polygon, and applying the interpolated angles to said shading circuit; and means for computing horizontal and vertical angles of light-source normals at each polygon vertex using coordinates of polygon vertices and light-sources in device coordinates, interpolating said horizontal and vertical angles across the inside of polygons with division by a distance component of eye-point axis in a perspective projection system, and applying the interpolated angles to said shading circuit.

10. A bump-mapped shading circuit as described in claim 1, wherein combining said bump and shading circuits with matrix and vector multiplication, said circuit comprising:

means for converting said horizontal and vertical angles of surface normal to matrix parameters for computing three-dimensional rotation using trigonometric functions with single input variables of either said horizontal or vertical angle, converting said horizontal and vertical angles of bump normal to a three-dimensional vector, composing the matrix and the vector to get three-dimensional vector components;

means for multiplying said first vector component with an arctangent of said light-source horizontal angle, multiplying said second vector component with a sine of said light-source vertical angle, adding said first and second multiplied components to get a diffuse-cosine, and concatenating said third vector component with the diffuse-reflection cosine; and means for multiplying said diffuse-reflection cosine with diffuse coefficient, texture pattern and light-source color, multiplying the specular-reflection cosine with specular coefficient, light-source color and specular color, and adding the diffuse and specular intensities.

11. A bump mapped shading circuit as described in claim 10 further combining said bump-mapped shading circuit with rotation-circuit of bump normal rotated by up-normal of bump-pattern, said further circuit comprising:

means for computing rotated angle of bump-pattern relative to a surface-normal using texture addresses and converting said angle to an up-normal using trigonometric function table; and means for applying said up-normal to matrix multiplier for rotating a bump normal read out from said bump normal RAM by said up-normal, and applying said rotated bump-normal to said bump-mapped shading circuit described in claim 10.

12. A bump-mapped shading circuit as described in claim 10, wherein excluding said light-source component from said RAM table of trigonometric function and rotating said bump normal with said surface normal at a vector and matrix circuit, said circuit comprising:

means for excluding said light-source components from definition of trigonometric function table, converting said surface normal to matrix parameters using said trigonometric function table, rotating bump normal of three-dimensional vector with said matrix parameters at said vector and matrix circuit, and multiplying said light-source components with said rotated three-dimensional vector components.

* * * * *